United States Patent [19]

Marbukh et al.

[11] 3,829,704

[45] Aug. 13, 1974

[54] ELECTRIC-HYDRAULIC GOVERNOR FOR A HYDRAULIC TURBINE

[76] Inventors: Veniamin Anatolievich Marbukh, ulitsa Tukhachevskogo 7, kv. 163; Veniamin Samuilovich Lychak, prospekt Metallistov 82, kv. 350; Evgeny Andreevich Goncharov, Zanevsky prospekt 15, kv. 33, all of Leningrad, U.S.S.R.

[22] Filed: June 21, 1973

[21] Appl. No.: 372,418

[52] U.S. Cl. .............................. 307/87, 290/40 A
[51] Int. Cl. ............................................ H02j 3/42
[58] Field of Search...... 290/40 R, 40 B, 4 A, 40 A, 290/40 E; 307/85, 86, 87, 153; 317/5

[56] References Cited
UNITED STATES PATENTS

| | | | |
|---|---|---|---|
| 2,564,439 | 8/1951 | Marrison | 307/87 |
| 2,689,919 | 9/1954 | Lytle | 307/87 |
| 2,828,427 | 3/1958 | Chilman et al. | 307/87 X |

*Primary Examiner*—Robert K. Schaefer
*Assistant Examiner*—William J. Smith
*Attorney, Agent, or Firm*—Waters, Roditi, Schwartz & Nissen

[57] ABSTRACT

In an electric-hydraulic governor for a hydraulic turbine there are electrically connected to the input of an amplifier an element for measuring the angular speed of the turbine-generator unit, a mechanism for varying the output frequency of the generator and an element for measuring the frequency in the associated mains. The said mechanism, with the turbine-generator unit idling, continuously follows up the deviation of the output frequency of the generator from the frequency of the mains and in every moment of time produces a signal representative of this deviation. The mechanism is controlled by an electric motor including a control winding connected to another amplifier. The input of this other amplifier is electrically connected with the output of the element for measuring the mains frequency and with the output of the said mechanism for varying the frequency of the output current of the generator. Following synchronization, upon connection of the turbine-generator unit to the mains, the element for measuring the mains frequency is disconnected from said second amplifier and the mechanism for varying the frequency of the output current of the generator is connected thereto.

1 Claim, 4 Drawing Figures

ELECTRIC-HYDRAULIC GOVERNOR FOR A HYDRAULIC TURBINE

The invention relates to the techniques of automatic regulation and control of a hydraulic turbine, and, more particularly, it relates to an electric-hydraulic governor for a hydraulic turbine.

Various electric-hydraulic governors for association with a hydraulic turbine are known.

In the known governors a tachogenerator supplies power to an element responsive to the angular speed of the turbine-generator unit. This element is connected to the input of an amplifier, to which there is also connected a mechanism for varying the frequency of the output current of the generator. The said mechanism is controlled by an electric motor and is intended for remote control of the angular speed of the turbine-generator unit when the latter is idling; upon connection of the hydraulic turbine-generator unit to the associated mains the same mechanism is employed for varying the power output of the turbine-generator unit. In the known governors, when the turbine-generator unit is idling, matching of the output frequency of the generator to that of the mains is effected with the help of an autosynchronizer effecting control action over said electric motor of the mechanism for varying the frequency of the output current of the generator when this frequency deviates from that of the mains.

A disadvantage of these known governors is the necessity of employing an additional apparatus — the autosynchronizer for matching the generator frequency to the mains frequency, as the turbine-generator unit is being synchronized with the mains.

Another disadvantage is inadequately fast action of the known governors, as they effect matching of the generator frequency to that of the mains, on account of the action of the autosynchronizer being exerted through the electric motor which is the integrating member. Provided the adjustment is optimal, the levelling out of the two frequencies is achieved in 1 – 2 minutes.

Moreover, the known governors acting through the autosynchronizer are altogether incapable of performing their function of matching the generator frequency to the mains frequency in cases of sharp fluctuations of the mains frequency.

It is an object of the present invention to create a governor that should feature fast action and should effect automatic matching of the output frequency of the generator to that of the mains without any additional apparatus.

With these and other object in view the present invention resides in an electric-hydraulic governor for a hydraulic turbine, wherein a tachogenerator drivenly connected to the shaft of the turbine-generator unit supplies power to an element for measuring the angular speed of the turbine-generator unit incorporating said hydraulic turbine and a power generator, said element being connected to the input of an amplifier, said input being further connected to a mechanism for varying the frequency of the output current of said generator, controlled by an electric motor, the output of said amplifier being connected to the regulator of opening of the stator of said hydraulic turbine, in which governor, in accordance with the present invention, with said turbine-generator unit idling, there is connected to said input of said amplifier through the first normally closed contact of the relay of the connector switch of said generator the output of an element for measuring the frequency of the associated mains; there being connected to the control winding of said electric motor through the second normally closed contact of said relay of said connection switch of said generator the output of an additional amplifier having the input thereof electrically connected to said output of said element for measuring the frequency of said mains and to the output of said mechanism for varying the frequency of said output current of said generator, said mechanism for varying the frequency of the output current of said generator being connected to said input of said additional amplifier through the third normally open contact of said relay of said connection switch of said generator, said mechanism, with said turbine-generator unit idling, effecting continuous following up of the deviation of the frequency of said mains from a standard frequency and in any given moment of time producing an electric signal representative of said deviation; the arrangement being such that following synchronization, upon said turbine-generator unit being connected to said mains, said first and said second normally closed contacts of said relay of said connection switch of said generator are opened, and said third normally open contact of said control relay of said connection switch of said generator is closed, connecting said mechanism for varying the frequency of the output current of said generator to said input of said additional amplifier.

Other objects and advantages of the present invention will be made apparent hereinbelow from the following description of the embodiments of the invention and from the appended drawings, wherein.

Figure 1:
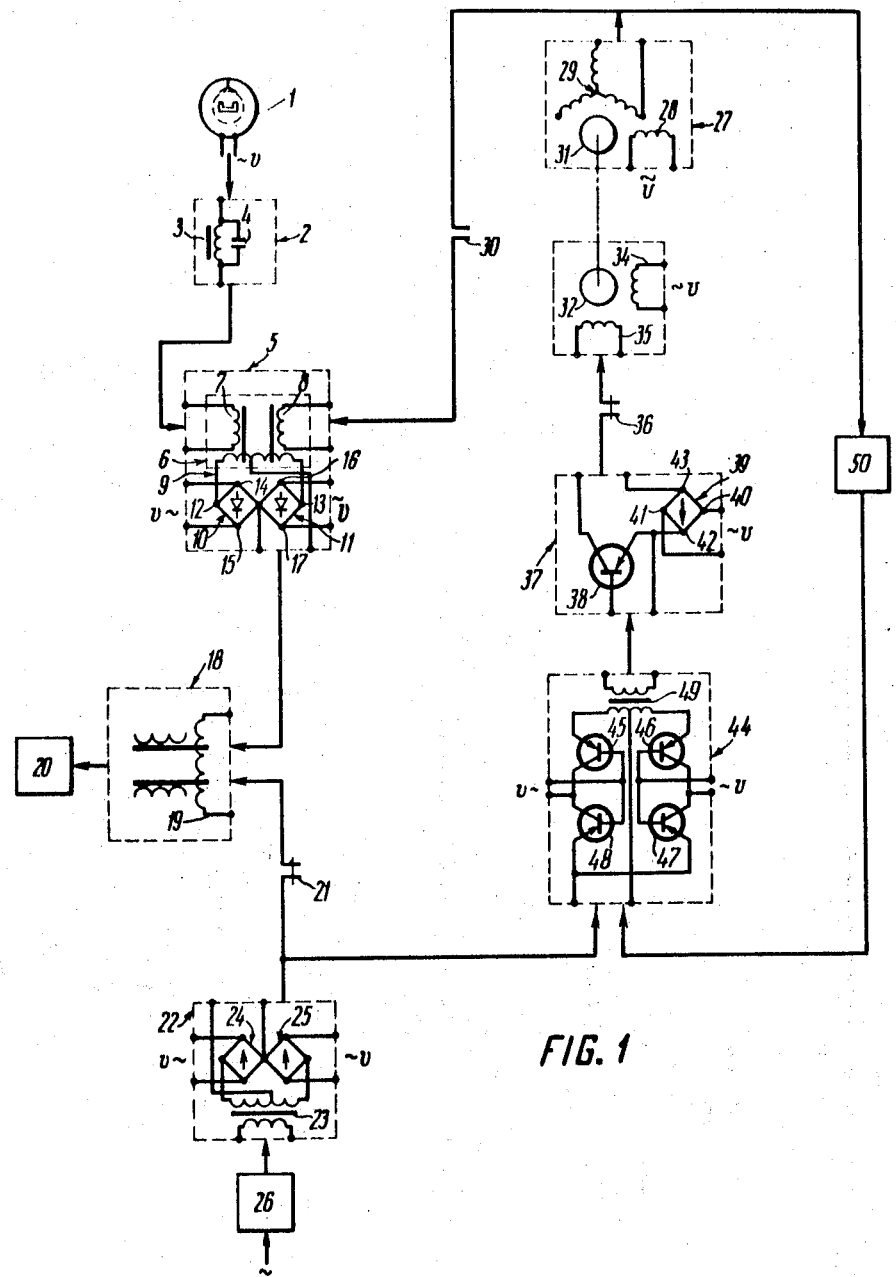
FIG. 1 is a circuit diagram of an electric-hydraulic governor for a hydraulic turbine, in accordance with the invention.

Referring now in particular to the appended drawings, the circuit diagram of the electric-hydraulic governor for a hydraulic turbine includes a tachogenerator 1 (FIG. 1) in the form of a synchronous generator wherein excitation is effected by permanent magnets. The tachogenerator 1 is drivenly connected to the shaft of turbine-generator unit including a power generator and a turbine and supplies with power an element 2 responsive to the angular speed of this turbine-generator unit. The element 2 includes a resonant circuit comprising a parallel connection of a choke 3 and a capacitor 4, tuned for resonance at a standard frequency. In the presently described embodiment this standard frequency is 50 Hz.

A means 5 for summation and demodulation of alternating current includes a summation transformer 6 with two input windings 7, 8 and a single output winding 9, as well as a pair of rectifier bridge circuits 10 and 11 incorporating diodes. The ends of the output winding 9 are connected to the terminals 12 and 13 of the rectifier bridge circuits 10 and 11, respectively. The terminals 14, 15 of the rectifier bridge circuit 10 and the terminals 16, 17 of the rectifier bridge circuit 11 are supplied with voltage V from the tachogenerator 1. This voltage effects switching of the two rectifier bridge circuits 10 and 11. The input winding 7 of the summation transformer 6 has connected thereto the output of the element 2 responsive to the angular speed of the turbine-generator unit.

The output of the means 5 for summation and demodulation of alternating current is connected to an amplifier 18. In the herein disclosed governor this amplifier may be a magnetic one, a thermionic one or a transistorized one. In the embodiment described the amplifier 18 is a magnetic direct-current amplifier of the push-pull kind, the working windings of the amplifier being supplied with voltage from the tachogenerator 1. The output of the means 5 is connected to the control winding 19 of the magnetic amplifier 18, while the output of the magnetic amplifier 18 is connected to the regulator of the degree of opening of the stator of the hydraulic turbine.

Furthermore, there is connected to the control winding 19 through a first normally closed contact 21 of the relay 21 associated with the mains connection switch of the power generator the output of a demodulator 22. The last-mentioned demodulator 22 has a structure similar to that of the means 5, i.e. it includes a transformer 23 and a pair of rectifier bridge circuits 24 and 25 incorporating diodes. The input of the demodulator 22 has connected thereto an element 26 for measuring the frequency of the associated power mains, having a structure similar to that of the element 2 for measuring the angular speed of the turbine-generator unit.

The input of the element 26 is connected to the power mains.

A mechanism 27 for varying the frequency of the output current of the generator includes a contact-less selsyn of which the excitation winding 28 is supplied with voltage V from the tachogenerator 1. Two phases of the three-phase winding 29 of the selsyn 27 are connected through the third normally open contact 30 of the relay 21 of the mains connection switch of the power generator to the input winding 8 of the summation transformer 6.

The rotor 31 of the selsyn 27 is drivenly connected with the rotor 32 of a two-phase electric motor 33 controlling the operation of the mechanism 27 varying the frequency of the output current of the power generator. The excitation winding 34 of the motor 33 is supplied with voltage V from the tachogenerator 1. The control winding 35 of the motor 33 is connected through the second normally closed contact 36 of the relay of the mains connection switch of the power generator to the output of an additional amplifier 37. This additional amplifier may be a magnetic one, a thermionic one or a transistorized one. In the presently described embodiment the amplifier 37 is a single-stage amplifier of which the circuit includes a transistor triode 38 and a rectifier bridge circuit 39 incorporating diodes. The terminals 40 and 41 of the rectifier bridge circuit 39 are supplied with voltage V from the tachogenerator 1. The terminal 42 of the rectifier bridge circuit 39 is connected to the emitter of the transistor 38. The terminal 43 of the rectifier bridge circuit 39 and the collector of the transistor 38 make up the output of the amplifier 37, whereas the anode-base circuit of the transistor 38 of the amplifier 37 presents the input thereof connected to the output of a modulator 44. The latter includes four transistor triodes 45, 46, 47 and 48 and an output transformer 49. The base of the transistor 45 is connected to the base of the transistor 48, while the base of the transistor 46 is connected with that of the transistor 47. The collector of the transistor 45 is connected to the collector of the transistor 48, while the collector of the transistor 46 is connected to that of the transistor 47. The emitters of the transistors 45 and 46 are interconnected through the primary winding of the output transformer 49, while the emitters of the transistors 48 and 47 are directly connected to each other. The input of the modulator 44 is constituted by the central point of the primary winding of the output transformer 49 and the interconnected emitters of the transistors 47, 48. The input of the modulator 44 is connected to the outputs of demodulators 22 and 50 having a similar structure. The input of the demodulator 50 is connected to the output of the mechanism 27 for varying the frequency of the output current of the power generator.

Figure 2:
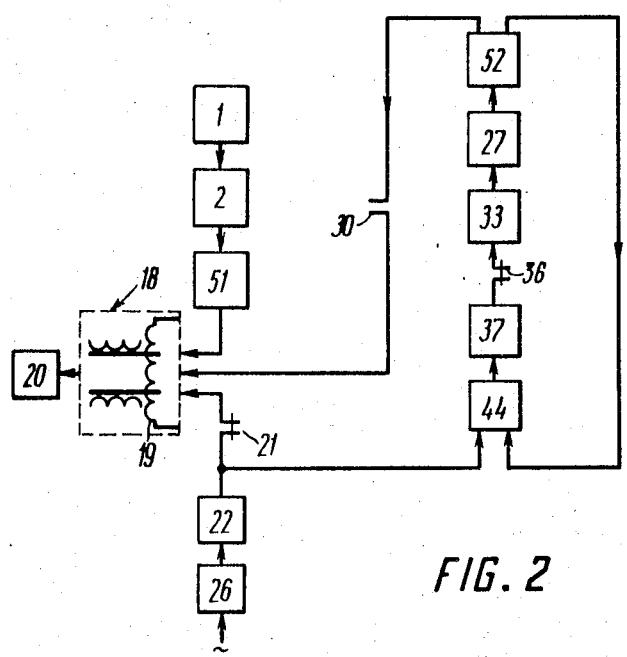
FIG. 2 is a block-unit structural diagram of a second embodiment of an electric-hydraulic governor for a hydraulic turbine, in accordance with the invention.

However, the connection of the components of the herein disclosed governor may be different from the one described hereinabove, which is illustrated in FIG. 2. The second embodiment of the electric-hydraulic governor for a hydraulic turbine differs from the first one described hereinabove in that here the element 2 for measuring the angular speed of the turbine-generator unit is connected to the control winding 19 of the magnetic amplifier 18 through a demodulator 51, while the mechanism 27 for varying the frequency of the output current of the power generator is connected by the output thereof to the same control winding 19 through a demodulator 52. The demodulators 51 and 52 are each of a structure similar to that of the demodulator 22. In the presently described embodiment the output currents, respectively, of the element 2 for measuring the angular speed of the turbine-generator unit and of the mechanism 27 for varying the output frequency of the power generator are first rectified and then summarized directly in the control winding 19 of the magnetic amplifier 18. In every other respect this embodiment is similar to the one described hereinabove.

The second embodiment requires demodulators with relatively more stable characteristics.

Figure 3:
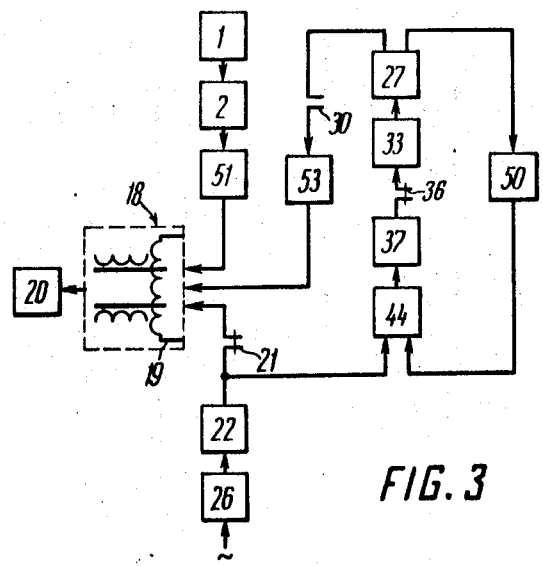
FIG. 3 is a block-unit structural diagram of a third embodiment of an electric-hydraulic governor for a hydraulic turbine, in accordance with the invention.

The connection of the components of the herein disclosed governor may be effected according to a circuit illustrated in FIG. 3. In this third embodiment the element 2 for measuring the angular speed of the turbine-generator unit is connected to the control winding 19 of the magnetic amplifier 18 through the demodulator 51, while the mechanism 27 for varying the output frequency is connected to the same winding through the normally open contact 30 of the relay of the mains connection switch of the power generator and through a demodulator 53. This contact 30 of the relay of the mains connection switch of the generator may be connected either in the A.C. circuit, as is shown in FIG. 2, or in the D.C. circuit of the mechanism 27 for varying the output frequency of the generator. Both in the second embodiment described hereinabove and in the presently described third embodiment the rectified output currents, respectively, of the element 2 for measuring the angular speed of the turbine-generator unit and of the mechanism 27 for varying the frequency of the output current of the generator are summarized directly in the control winding 19 of the magnetic ampliifier 18.

The second embodiment is preferable to the third one in that it saves one demodulator.

Figure 4:
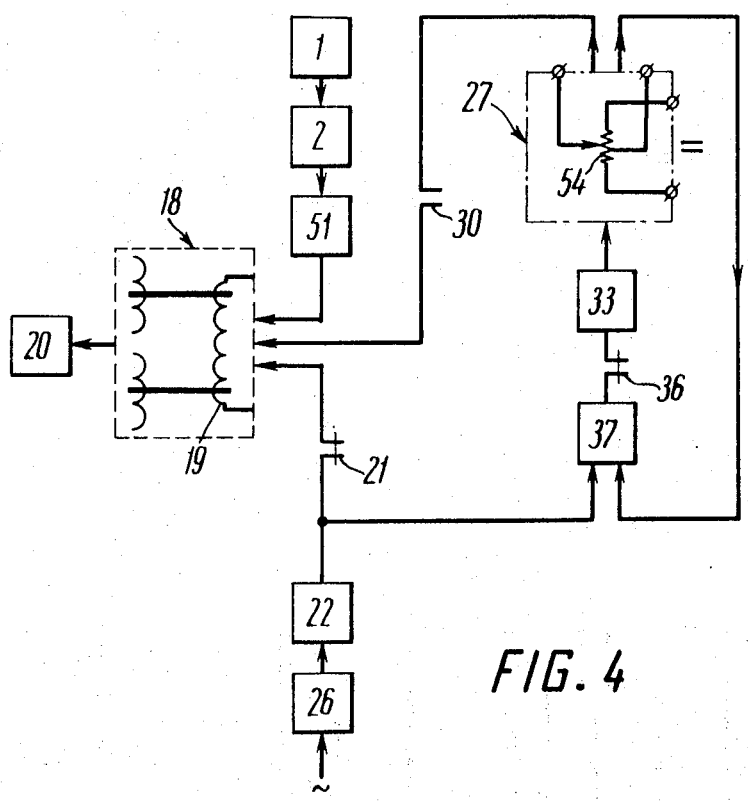
FIG. 4 is a block-unit structural diagram of a fourth embodiment of an electric-hydraulic governor for a hydraulic turbine, in accordance with the invention, wherein the frequency varying mechanism is the form of a potentiometer.

The pattern of the connections between the components of the herein disclosed governor becomes somewhat different when the mechanism for varying the frequency is in the form of a contact-type device, e.g. a wire potentiometer, as is shown in FIG. 4.

The slide 55 of the potentiometer having the output lead issuing from a central point thereof is mechanically connected to the rotor of the electric motor 33. The potentiometer is supplied with the rectified current from the tachogenerator 1. The mechanical connection is such that when the motor 33 rotates, the slide of the potentiometer is displaced, whereby the voltage across the central point of the potentiometer and the slide is varied.

With the last-described connection pattern it is unnecessary to employ the demodulator 52 and the modulator 44 shown in FIG. 2. In every other respect the arrangement and the operation of the two circuits are similar.

It should be born in mind, however, that a contact-type device, in general, is less reliable than a contactless one.

It can be understood that it is possible to construct other modified circuitries, in addition to those described hereinabove, without departing from the spirit and scope of the present invention.

The herein disclosed electric-hydraulic governor for a hydraulic turbine effects automatic matching of the output frequency of the power generator to that of the associated mains in the following manner.

The tachogenerator 1 (FIG. 1) generates a current having the same frequency as that of the power generator and feeds this current to the element 2 measuring the angular speed of the turbine-generator unit. The resonant circuit of the element 2 being tuned for resonance at the standard frequency, there is developed at the output thereof an electric signal representative of a deviation of the output frequency of the generator from that of the standard frequency and proportional to this deviation. From the output of the element 2 this signal proportional to the standard frequency (to the deviation from the standard frequency) is fed to the input winding 7 of the summation transformer 6. The contact 30 of the control relay of the connection switch of the generator is open, whereby no signal comes to the input winding 8 of the summation transformer. The transformed current at the output of the means 5, rectified by the rectifier bridge circuits 10 and 11 is thus proportional to the deviation of the frequency of the generator from the standard frequency. Furthermore, this current changes its direction or polarity to the opposite one, when the phase of the alternating current by the fact that the circuitry of the means 5 is phase-responsive, which is attained in a generally known manner. The output current of the means 5 is supplied to the control winding 19 of the magnetic amplifier 18.

Since the resonant circuit of the element 26 is likewise tuned for resonance at the standard frequency, the element 26 develops an output signal when the mains frequency deviates from this standard frequency, the signal being proportional to this deviation. This signal proportional to the deviation of the mains frequency from the standard frequency is fed to the input of the demodulator 22 having the phase-responsive circuitry, operating and constructed in the generally known way. The rectified output current of the demodulator 22, of which the direction or polarity changes to the opposite one following a change of the phase of the alternating current at the input of the demodulator 22, is fed to the control winding 19 of the magnetic amplifier 18. Quite obviously, this current is proportional to the deviation of the mains frequency from the standard frequency. The current proportional to the deviation of the power generator frequency from the standard frequency and the current proportional to the deviation of the mains frequency from the standard frequency are summarized in the control winding 19 of the magnetic amplifier 18. The governor is balanced when no current flows through the control winding 19 of the magnetic amplifier 18, i.e. when the deviations, respectively, of the power generator frequency and of the mains frequency from the standard frequency are equal to each other. In any other case there is developed a signal at the output of the magnetic amplifier 18, proportional to the sum of the deviations of the mains frequency and of the power generator frequency from the standard frequency, which signal acts in a corresponding way to vary the degree of opening of the stator of the hydraulic turbine, whereby the angular speed of the turbine-generator unit is varied, which means that the frequency of the power generator is varied, too. This in its turn, varies the value of the current proportional to the deviation of the power generator frequency from the standard frequency, i.e. varies the summarized current flowing through the control winding 19 of the magnetic amplifier 18, whereby the degree of opening of the stator of the turbine is varied still further. The last-described process continues until the current flowing through the control winding 19 drops down to zero, i.e. until the deviation of the power generator frequency from the standard frequency equals the deviation of the mains frequency from the standard frequency.

In the abovedescribed manner the herein disclosed governor, with the turbine-generator unit idling, automatically matches the power generator frequency to the mains frequency, and that without any additional devices or apparatus.

Following synchronization, upon the turbine-generator unit being connected to the mains, the contacts 21 and 36 of the relay of the mains connection switch of the generator are made to open, and the contact 30 is closed. This is not accompanied by any disbalance in the herein disclosed governor, i.e. by any sharp variation of the power output of the turbine-generator unit, since the output signal of the demodulator 22 is replaced with an equivalent output signal coming from the mechanism 27 for varying the frequency of the output current of the generator. The equivalence of these signals is attained by the mechanism 27, with the turbine-generator unit idling, continuously following up the deviation of the frequency of the mains from the standard frequency and in any given moment of time producing a signal proportional to this deviation.

Let us consider the manner in which the mechanism 27 effects this continuous follow-up of the deviation of the mains frequency from the standard one, when the turbine-generator unit is idling.

In this mode of operation the contacts 21 and 36 are closed, and the contact 30 is open. The output signal from the mechanism 27 is fed to the input of the demodulator 50. Rectified current from the output of the demodulator 50 is fed to the input of the modulator 44 which is also fed by the current proportional to the deviation of the mains frequency from the standard frequency, coming from the output of the demodulator 22. These currents are summarized in the modulator 44 and modulated with the voltage V. The modulator 44 has a two-stage circuit of which the performance is generally known per se. The summarized current is fed from the output of the modulator 44 to the input of the additional amplifier 37 of which the circuit is also generally known and from the output of this amplifier the signal is supplied to the control winding 35 of the motor 33. The presence of a current flowing through the control winding 35 brings about rotation of the rotor 32 of the motor 33. The rotor 31 of the selsyn of the mechanism 27 being drivenly connected with the shaft of the rotor 32 of the motor 33, the rotor 31 is thus also rotated. This rotation of the rotor 31 results in corresponding variation of the output signal of the mechanism 27, which, in its turn, varies the summarized current flowing through the winding 35 of the motor 33. This again results in rotation of the rotors 32 and 31 and in corresponding variation of the output signal of the mechanism 27. The follow-up system becomes balanced when the current flowing through the control winding 35 of the electric motor 33 is brought down to zero.

This takes place when the output signal of the mechanism 27 becomes equal to the signal proportional to the deviation of the mains frequency from the standard frequency, coming from the output of the element 26.

The advantage offered by the present invention is that it bestows upon an electric-hydraulic governor for a hydraulic turbine an additional valuable property — that of effecting automatic matching of the output frequency of the generator to that of the mains, without the incorporation of any autosynchronizer and with sufficiently fast action.

What is claimed is:

1. An electric-hydraulic governor for a hydraulic turbine-combined with a power generator into a turbine-generator unit, said governor comprising: a tachogenerator, drivenly connected with the shaft of said turbine-generator unit; an element for measuring the angular speed of said turbine-generator unit, connected to said tachogenerator and supplied with power therefrom; a mechanism for varying the frequency of the output current of said power generator, adapted, with said turbine-generator unit idling, to effect continuous follow-up of the deviation of the frequency of the associated mains from a standard frequency and to produce in any given moment of time a signal representative of this deviation; an electric motor with a control winding, adapted to control said mechanism for varying the frequency of the output current of said power generator; a relay associated with the mains connection switch of said power generator, having three contacts of which the first and the second contacts are normally closed and the third contact is normally open; an amplifier having connected to the input thereof: said element for measuring the angular speed of said turbine-generator unit, an element for measuring the frequency of said associated mains which is connected to said input through said first normally closed contact of said relay and said mechanism for varying the output frequency of said power generator, connected to said input through said third normally open contact; a second additional amplifier connected through said second normally closed contact to said control winding of said electric motor; the arrangement being such that following synchronization, upon connection of said turbine-generator unit to said mains, said first and second normally closed contacts are opened, and said third normally open contact is closed.

* * * * *